(12) United States Patent
Yoshida et al.

(10) Patent No.: US 11,737,177 B2
(45) Date of Patent: Aug. 22, 2023

(54) INDUCTION HEATING COIL AND ITS MANUFACTURING METHOD

(71) Applicant: TOYOTA JIDOSHA KABUSHIKI KAISHA, Toyota (JP)

(72) Inventors: Mitsutaka Yoshida, Nagakute (JP); Takeshi Gogami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 17/646,183

(22) Filed: Dec. 28, 2021

(65) Prior Publication Data

US 2022/0248507 A1 Aug. 4, 2022

(30) Foreign Application Priority Data

Feb. 2, 2021 (JP) .................. 2021-014857

(51) Int. Cl.
*H05B 6/36* (2006.01)
*H05B 6/10* (2006.01)

(52) U.S. Cl.
CPC ............... *H05B 6/36* (2013.01); *H05B 6/103* (2013.01)

(58) Field of Classification Search
CPC . H05B 6/103; H05B 6/36; H05B 6/42; H05B 6/44
USPC .................. 219/672, 623–624, 630
See application file for complete search history.

(56) References Cited

U.S. PATENT DOCUMENTS

| | | | | |
|---|---|---|---|---|
| 8,716,636 B2 * | 5/2014 | Bollman | ................... | C21D 1/10 219/676 |
| 10,406,581 B2 * | 9/2019 | Okada | ..................... | H05B 6/104 |
| 2015/0327335 A1 * | 11/2015 | Yamamoto | ........... | B23K 26/342 219/76.1 |
| 2019/0308272 A1 * | 10/2019 | Yamamoto | ............... | H05B 6/42 |
| 2020/0118741 A1 * | 4/2020 | Prest | ........................ | H05B 6/42 |
| 2021/0321495 A1 * | 10/2021 | Yasutake | ................ | H05B 6/102 |

FOREIGN PATENT DOCUMENTS

| | | |
|---|---|---|
| JP | 2006-10052 A | 1/2006 |
| JP | 2018-10876 A | 1/2018 |

* cited by examiner

*Primary Examiner* — Dana Ross
*Assistant Examiner* — James F Sims, III
(74) *Attorney, Agent, or Firm* — Oblon, McClelland, Maier & Neustadt, L.L.P.

(57) ABSTRACT

An induction heating coil according to the present disclosure includes a pair of arcuate pipes curved in an arcuate shape along a circumferential direction of an outer peripheral surface of a cylindrical object to be heated, and a straight pipe connecting one ends of the arcuate pipes to each other, in which at least one wall is formed inside the straight pipe, the at least one wall extending along a longitudinal direction of the straight pipe and dividing an internal path of the straight pipe into a plurality of paths, and at least one rhombic through holes is formed in the wall.

6 Claims, 14 Drawing Sheets

INDUCTION HEATING COIL AND ITS MANUFACTURING METHOD

CROSS REFERENCE TO RELATED APPLICATIONS

This application is based upon and claims the benefit of priority from Japanese patent application No. 2021-014857, filed on Feb. 2, 2021, the disclosure of which is incorporated herein in its entirety by reference.

BACKGROUND

The present disclosure relates to an induction heating coil and a method for manufacturing an induction heating coil. In particular, the present disclosure relates to a method for manufacturing an induction heating coil, in which the induction heating coil is molded by repeatedly forming metal layers each of which is formed by applying a laser beam to a predetermined area of a metal powder deposited in a layered state, and thereby melting and solidifying the metal powder in the predetermined area.

In recent years, an additive manufacturing technology (so-called the "3D printer technology") has been in the limelight. In the additive manufacturing technology, an article having a 3D (three-dimensional) shape is molded by repeatedly applying a laser beam to a predetermined area of a metal powder deposited in a layered state, thereby melting and solidifying the metal powder in the predetermined area, and by doing so, laminating and integrating a large number of metal layers with one another.

Japanese Unexamined Patent Application Publication No. 2018-010876 discloses a method for manufacturing an induction heating coil by using such an additive manufacturing technology.

SUMMARY

The inventors have found the following problem in regard to the induction heating coil disclosed in Japanese Unexamined Patent Application Publication No. 2018-010876. When an induction heating coil used for induction heating of a cylindrical object to be heated is molded at an inclination angle of 90° (i.e., in a state in which the induction heating coil to be molded is inclined at 90°) by using the additive manufacturing method, it is necessary to form a support inside the induction heating coil. Detailed descriptions will be given hereinafter with reference to FIGS. 12 to 14.

FIGS. 12 to 14 are schematic perspective views of an induction heating coil 300 manufactured by a method for manufacturing an induction heating coil in related art. The z-axis positive direction is a vertically upward direction, and the xy-plane is parallel to the horizontal plane. The inclination angle of the induction heating coil 300 in a state in which the area occupied by the induction heating coil 300 is maximized in the plane view, i.e., in a state in which a piping part 100 of the induction heating coil 300 is placed on the positive side on the x-axis and a coil part 200 is placed on the negative side on the x-axis, is defined as 0°. Further, as shown in FIG. 12, the inclination angle of the induction heating coil 300 in a state in which the area occupied by the induction heating coil 300 is minimized in the plane view, i.e., in a state in which the piping part 100 of the induction heating coil 300 is placed on the positive side on the z-axis and the coil part 200 is placed on the negative side on the z-axis, is defined as 90°.

FIG. 13 is an enlarged view of an area indicated by a symbol XIII in FIG. 12. When the inclination angle of the induction heating coil 300 during the molding is 90° as shown in FIG. 12, it is necessary to form a support S inside a hollow path 207 of a straight pipe 203 as shown in FIG. 13. After the molding, the support S formed inside the path 207 cannot be removed, thus causing a problem that it hinders the flow of a refrigerant such as a coolant inside the path 207 of the straight pipe 203.

Note that in order to form the straight pipe 203 without forming the support S inside the path 207 thereof in the induction heating coil manufactured by the manufacturing method in related art, it is necessary to set the inclination angle of the induction heating coil 300 to 45° during the molding as shown in FIG. 14. However, when the induction heating coil 300 is manufactured at the inclination angle of 45° as shown in FIG. 14, it requires a larger area on the xy-plane during the molding than the area required when it is manufactured at the inclination angle of 90° as shown in FIG. 12. For example, as shown in FIG. 14, the number of induction heating coils 300 that can be simultaneously formed is small, e.g., is two as shown in the example, thus causing a problem that the production efficiency is low.

The present disclosure has been made in view of the above-described problem, and provides an induction heating coil that can be molded by the additive manufacturing method without forming a support inside thereof, and is capable of prevent unevenness of a water temperature over a plurality of paths inside a straight pipe, and provides a method for manufacturing such induction heating coils by which the production efficiency can be improved.

A first exemplary aspect is an induction heating coil includes:

a pair of arcuate pipes curved in an arcuate shape along a circumferential direction of an outer peripheral surface of a cylindrical object to be heated; and a straight pipe connecting one ends of the arcuate pipes to each other, in which at least one wall is formed inside the straight pipe, the at least one wall extending along a longitudinal direction of the straight pipe and dividing an internal path of the straight pipe into a plurality of paths, and at least one rhombic through hole is formed in the wall.

In the induction heating coil according to the present disclosure, at least one wall, which extends along the longitudinal direction of the straight pipe and divides the internal path of the straight pipe into a plurality of paths, is formed inside the straight pipe. Therefore, the wall functions as a support, so that there is no need to form a support inside the straight pipe. Further, at least one rhombic through hole is formed in the wall. Therefore, it is possible to prevent unevenness of the water temperature which would otherwise occur over the plurality of paths inside the straight pipe.

A distance between adjacent walls may be 5 mm or shorter. By the above-described configuration, there is no need to form a support inside the straight pipe.

Another exemplary aspect is a method for manufacturing an induction heating coil, in which the induction heating coil is molded by repeating:

depositing a metal powder in a layered state; and forming metal layers by repeatedly applying a laser beam to a predetermined area of the metal powder deposited in the layered state, and thereby melting and solidifying the metal powder in the predetermined area, and successively laminating the metal layers vertically upward, in which the induction heating coil includes a pair of arcuate pipes curved in an arcuate shape along a circumferential direction of an outer peripheral surface of a cylindrical object to be heated, and a straight pipe connecting one ends of the arcuate pipes to each other, at least one wall is formed inside the straight pipe, the at least one wall extending along a longitudinal direction of the straight pipe and dividing an internal path of the straight pipe into a plurality of paths, and at least one rhombic through hole is formed in the wall.

In the method for manufacturing an induction heating coil according to the present disclosure, at least one wall, which extends along the longitudinal direction of the straight pipe and divides the internal path of the straight pipe into a plurality of paths, is formed inside the straight pipe. Therefore, the wall functions as a support, so that there is no need to form a support inside the straight pipe during the molding. Further, at least one rhombic through hole is formed in the wall. Therefore, it is possible to prevent unevenness of the water temperature which would otherwise occur over the plurality of paths inside the straight pipe.

A distance between adjacent walls may be 5 mm or shorter. By the above-described configuration, it is possible to manufacture an induction heating coil without causing sagging in the hollow straight pipe. Therefore, there is no need to form a support inside the straight pipe.

The arcuate pipe may be molded after the straight pipe is molded. By the above-described configuration, it is possible to improve the production efficiency.

According to the present disclosure, it is possible to provide an induction heating coil that can be molded by the additive manufacturing method without forming a support inside thereof, and is capable of prevent unevenness of a water temperature over a plurality of paths inside a straight pipe, and to provide a method for manufacturing such induction heating coils by which the production efficiency can be improved.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
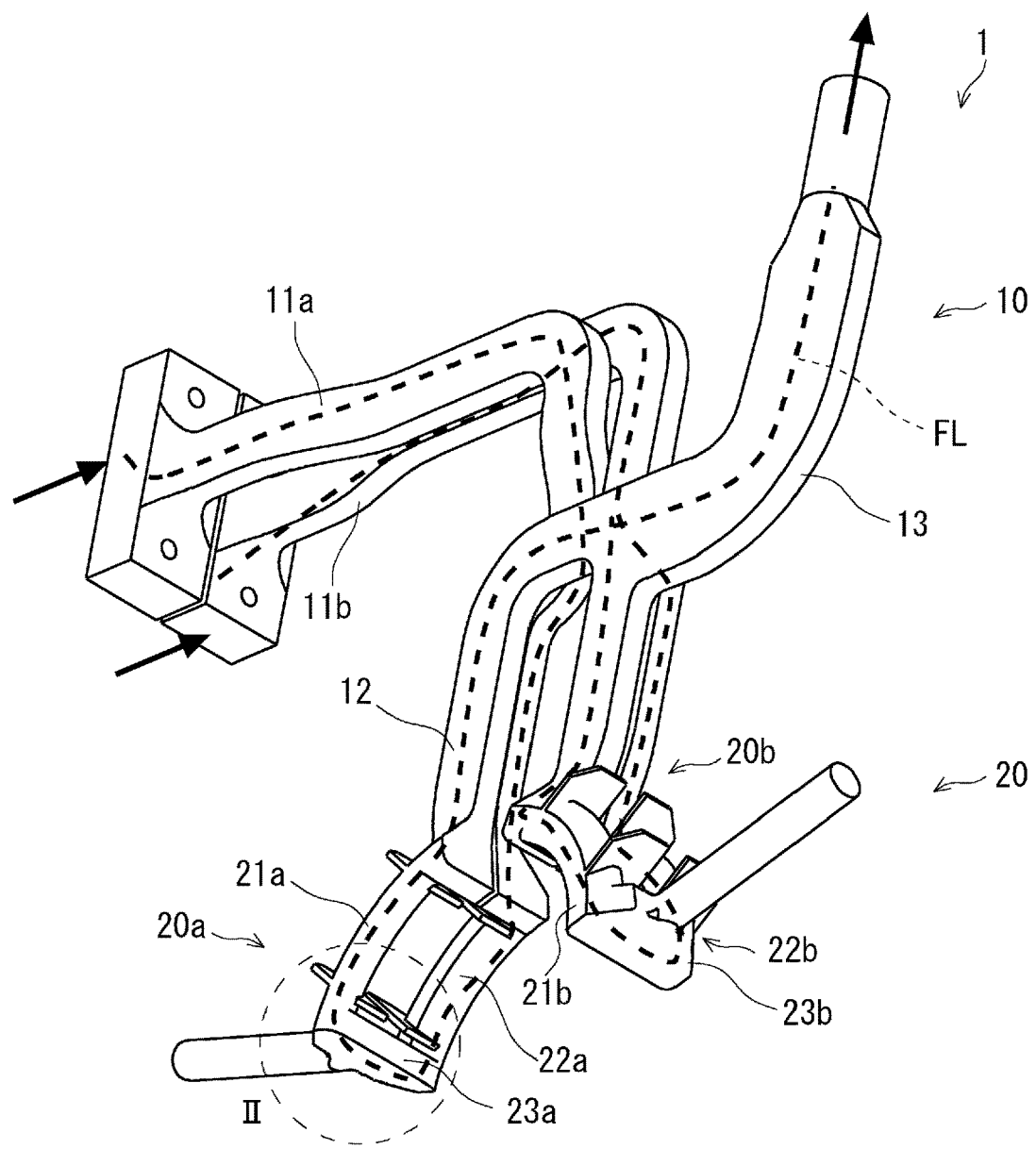
FIG. 1 is a schematic perspective view showing an induction heating coil according to an embodiment.

Specific embodiments according to the present disclosure will be described in detail with reference to the drawings.

Note that right-handed xyz-orthogonal coordinate systems shown in the drawings are shown just for the sake of convenience in order to explain the positional relation among the components. The z-axis positive direction is a vertically upward direction unless otherwise specified. Further, the xy-plane is parallel to the horizontal plane.

Embodiment

<Configuration of Induction Heating Coil>

Firstly, a configuration of an induction heating coil according to an embodiment will be described with reference to FIG. 1.

FIG. 1 is a schematic perspective view showing an induction heating coil 1 according to an embodiment. The induction heating coil 1 is made of, for example, pure copper or a copper-based alloy such as chromium copper. As shown in FIG. 1, the induction heating coil 1 includes a piping part 10 and a coil part 20.

As shown in FIG. 1, the piping part 10 includes a pair of lead pipes 11a and 11b, a connection pipe 12, and a drainage pipe 13. Each of the components of the piping part 10 is composed of a rectangular pipe of which the wide surfaces (i.e., opposed surfaces having larger areas) are perpendicular to the y-axis direction (i.e., of which the width in the y-axis direction is small).

Further, the coil part 20 inductively heats (i.e., heats by induction heating) a cylindrical object to be heated, whose central axis is parallel to the y-axis, from the outside thereof. An example of the object to be heated indicated by doubledotted lines in FIG. 1 is a crank pin CP of a crankshaft. Another example of the object to be heated is a crank journal of a crankshaft. As shown in FIG. 1, the coil part 20 includes a pair of arcuate coils 20a and 20b curved in an arcuate shape along the circumferential direction of the outer peripheral surface of the crank pin CP.

Further, as shown in FIG. 1, the arcuate coil 20a includes a first arcuate pipe 21a, a second arcuate pipe 22a, and a straight pipe 23a. The straight pipe 23a is a pipe that connects one ends of the first and second arcuate pipes 21a and 22a to each other. Similarly, the arcuate coil 20b includes a first arcuate pipe 21b, a second arcuate pipe 22b, and a straight pipe 23b. The straight pipe 23b is a pipe that connects one ends of the first and second arcuate pipes 21b and 22b to each other.

As shown in FIG. 1, the lead pipes 11a and 11b extend upward (in the z-axis positive direction) and are arranged side by side in the y-axis direction. Further, each of the ends (on the negative side on the x-axis) of the lead pipes 11a and 11b is connected to a high-frequency power supply (not shown). Meanwhile, the lower end of the lead pipe 11a is connected to a base part (the upper end) of the second arcuate pipe 22a of the arcuate coil 20a, and the lower end of the lead pipe 11b is connected to a base part (the upper end) of the second arcuate pipe 22b of the arcuate coil 20b.

As shown in FIG. 1, the connection pipe 12 connects the pair of arcuate coils 20a and 20b to each other. In the example shown in FIG. 1, the connection pipe 12 has a U-shape on the xz-plane. Specifically, the connection pipe 12 extends upward from the base part (the upper end) of the first arcuate pipe 21a of the arcuate coil 20a, and includes a part that is arranged side by side with a part of the lead piping 11a in the y-axis direction. Further, the connection pipe 12 includes a part that extends upward from the base part (the upper end) of the first arcuate pipe 21b of the arcuate coil 20b. Further, the upper ends of both of the parts, which are arranged side by side in the x-axis direction, are connected to each other by another part of the connection pipe 12 extending in the x-axis direction.

One end of the drainage pipe 13 is connected to the end of the connection pipe 12, and a coolant is discharged from the other end of the drainage pipe 13. The other end of the drainage pipe 13 is electrically insulated, so that no electric current flows through the drainage pipe 13.

Each of the first and second arcuate pipes 21a and 22a of the arcuate coil 20a is a rectangular pipe curved roughly in a ¼ arcuate shape along the circumferential direction of the outer peripheral surface of the crank pin CP, and they are arranged side by side in the y-axis direction. Further, the tips (the lower ends) of the first and second arcuate pipes 21a and 22a are connected to each other by the straight pipe 23a extending in the axial direction of the crank pin CP (i.e., in the y-axis direction).

Similarly, each of the first and second arcuate pipes 21b and 22b of the arcuate coil 20b is a rectangular pipe curved roughly in a ¼ arcuate shape along the circumferential direction of the outer peripheral surface of the crank pin CP, and they are arranged side by side in the y-axis direction. Further, the tips (the lower ends) of the first and second arcuate pipes 21b and 22b are connected to each other by the straight pipe 23b extending in the axial direction of the crank pin CP (i.e., in the y-axis direction).

An electric current and a flow FL of a coolant in the induction heating coil 1 will be described hereinafter.

In FIG. 1, an electric current supplied from a high-frequency power supply flows through the lead pipe 11a, the arcuate coil 20a, the connection pipe 12, the arcuate coil 20b, and the lead pipe 11b in this order or in a reversed order.

Further, in FIG. 1, a coolant for cooling the arcuate coil 20a is fed from the end of the lead pipe 11a, passes through the arcuate coil 20a and the connection pipe 12, and is discharged from the drainage pipe 13. In FIG. 1, the flow FL of the coolant is indicated by broken lines.

Meanwhile, a coolant for cooling the arcuate coil 20b is fed from the end of the lead pipe 11b, passes through the arcuate coil 20b and the connection pipe 12, and is discharged from the drainage pipe 13.

Note that the refrigerant that is made to flow inside the induction heating coil is not limited to the coolant.

Next, an internal structure of the straight pipe 23a will be described with reference to FIGS. 2 to 4.

Figure 2:
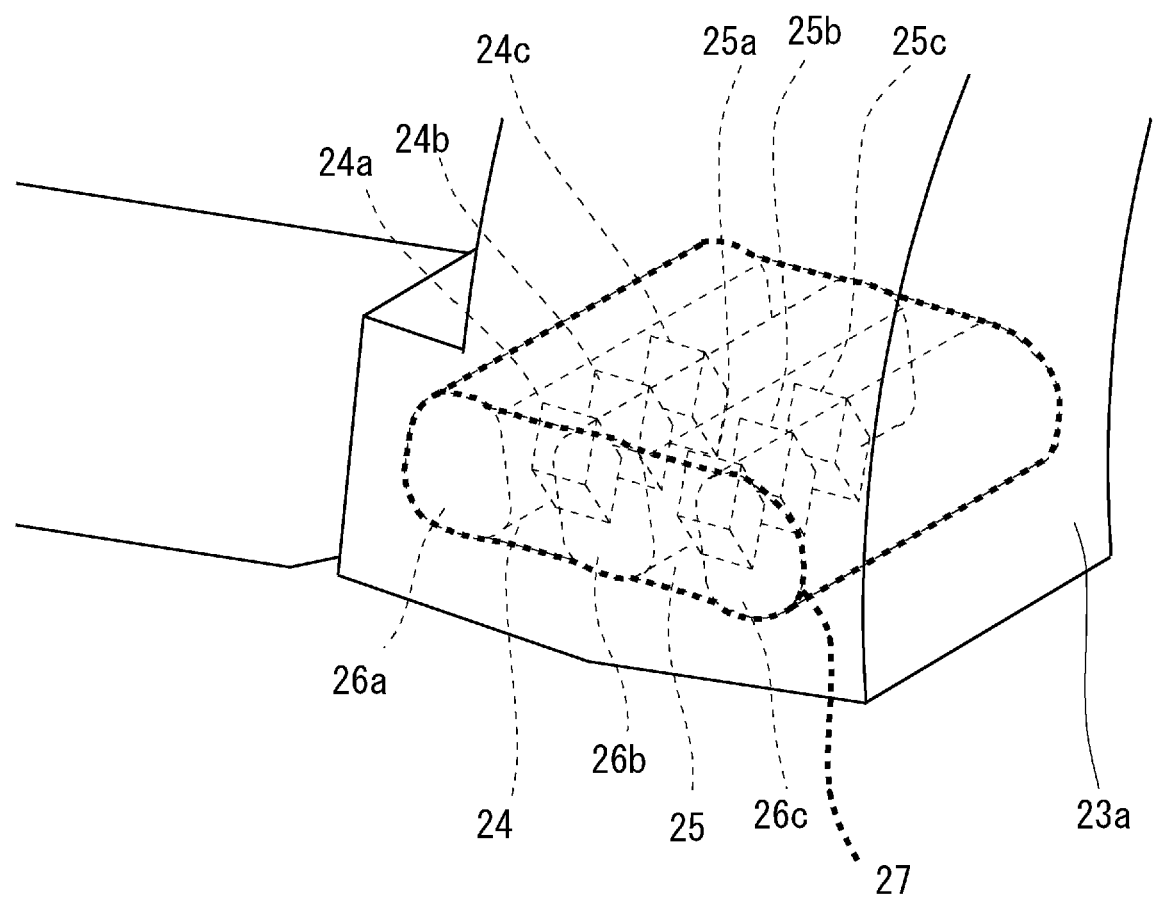
FIG. 2 is a perspective view showing an internal structure of a straight pipe of the induction heating coil according to the embodiment.
Figure 2:
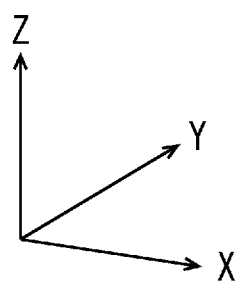

FIG. 2 is a perspective view showing the internal structure of the straight pipe 23a of the induction heating coil 1 according to the embodiment. FIG. 2 shows an area II indicated by a broken line in FIG. 1. The straight pipe 23b, which constitutes a pair with the straight pipe 23a, has an internal structure similar to that of the straight pipe 23a, which will be described hereinafter.

As shown in FIG. 2, walls 24 and 25 are formed in an internal path 27 of the straight pipe 23a. Each of the walls 24 and 25 extends along the longitudinal direction of the straight pipe 23a (i.e., in the y-axis direction), and has a roughly prism shape (i.e. rectangular cylinder shape). The walls 24 and 25 divide the internal path 27 of the straight pipe 23a into a plurality of paths 26a, 26b and 26c. Note that the internal path 27 refers to the path through which the coolant flows as described above. Each of the paths 26a, 26b and 26c formed by dividing the internal path 27 by the walls 24 and 25 has roughly a cylindrical shape. The walls 24 and 25 function as supports when the induction heating coil according to this embodiment molded by the additive manufacturing method. Therefore, it is possible to mold the induction heating coil by the additive manufacturing method without forming any support in the internal path 27.

In the wall 24, through holes 24a, 24b and 24c, which connect the path 26a with the path 26b, are formed. Similarly, in the wall 25, through holes 25a, 25b and 25c, which connect the path 26b with the path 26c, are formed. Each of the through holes has a rhombic shape in cross section, and details thereof will be described later with reference to FIG. 4. Although an example in which three through holes are formed in each wall are described above with reference to FIG. 2, it is sufficient if at least one through hole is formed in each wall. By providing at least one through hole in each wall, the coolant can flow between adjacent paths. During the induction heating, the path 26c, which is closer to the object to be heated, has a higher temperature than that of the path 26a, which is farther from the object to be heated. However, by providing a through hole(s) between the paths, it is possible to prevent or reduce the unevenness of the water temperature of the coolant between the paths.

Figure 3:
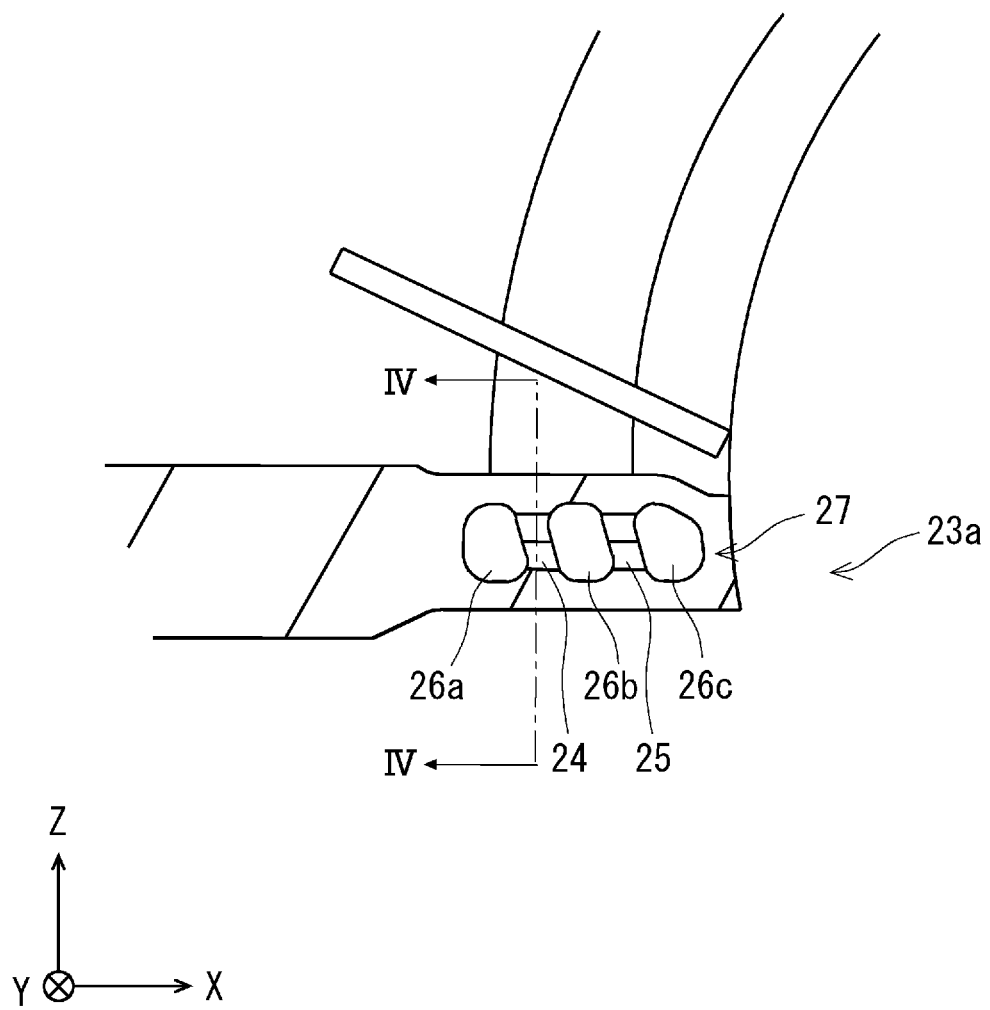
FIG. 3 is a front cross-sectional view showing the internal structure of the straight pipe of the induction heating coil according to the embodiment.

FIG. 3 is a front cross-sectional view showing the internal structure of the straight pipe 23a of the induction heating coil according to the embodiment. The distance between the walls 24 and 25, which are adjacent to each other, is 5 mm or shorter. In other words, the walls 24 and 25 are formed so that the width of the path 26b, which is formed between the walls 24 and 25, along the x-axis on the xy-plane on the positive side on the z-axis is 5 mm or shorter. In other words, in the internal path 27, the walls are formed so that the width of each of a plurality of paths along the x-axis on the xy-plane on the positive side on the z-axis is 5 mm or shorter. By the above-described configuration, it is possible to manufacture the induction heating coil without causing sagging in the hollow straight pipe 23a. Therefore, there is no need to form a support inside the straight pipe.

Figure 4:
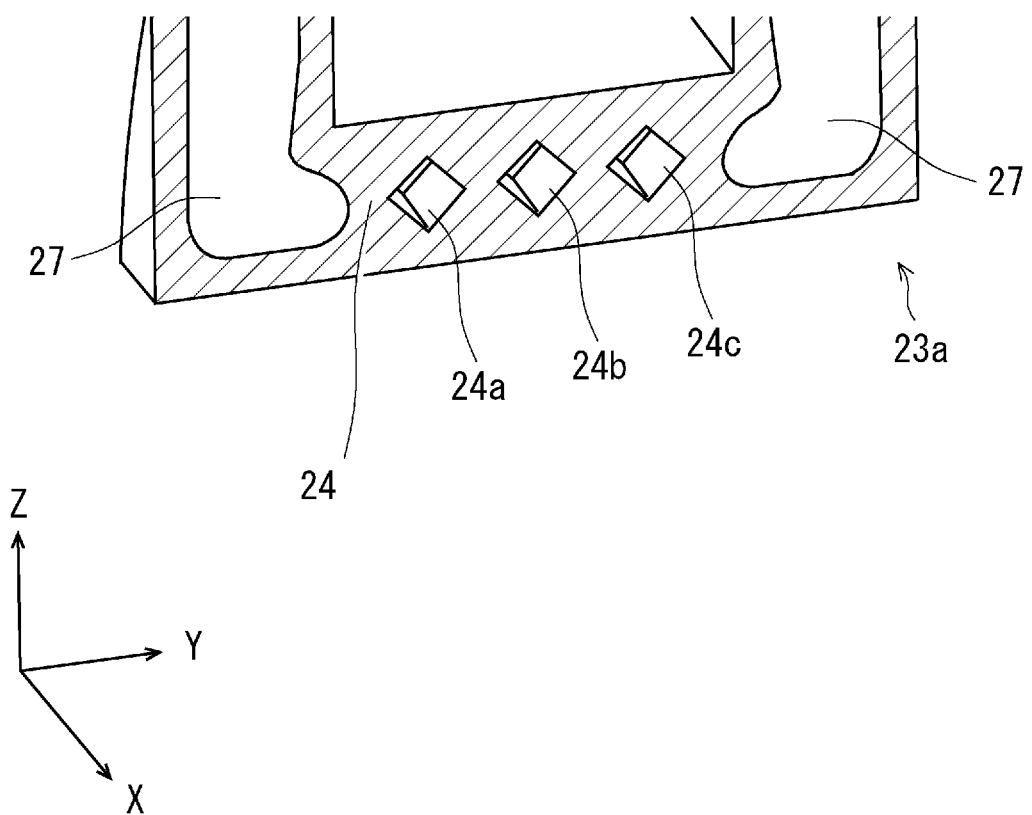
FIG. 4 is a perspective cross-sectional view taken along a line IV-IV in FIG. 3.

FIG. 4 is a perspective cross-sectional view taken along a line IV-IV in FIG. 3. As shown in FIG. 4, each of the through holes 24a, 24b and 24c has a rhombic shape in cross section. That is, each of the through holes 24a, 24b and 24c has a square cylindrical shape and has a rhombic shape in cross section. Note that the "rhombic shape" in this specification means a square in which the length of all the four sides are equal to each other, and all the four interior angles are right angles. As shown in FIG. 4, the through holes 24a, 24b and 24c are formed so that the aforementioned squares are oriented at an inclination angle of 45° on the yz-plane. By forming each of the through holes so that it has a rhombic shape in cross section, it is possible to form the through holes 24a, 24b and 24c each having a square cylindrical shape while preventing sagging from occurring during the additive manufacturing.

Further, since the piping part 10 and the coil part 20 are integrally molded in the induction heating coil 1 according to this embodiment, it has a longer life span than an induction heating coil that is manufactured by bonding all the components thereof together by brazing. The term "life span" means a period of time by which the induction heating coil cannot be used any longer due to water leakage or the like. Specifically, while an induction heating coil manufactured by brazing can be used for an average of 20,000 shots and a maximum of 30,000 shots, the induction heating coil 1 according to this embodiment can be used for 90,000 shots. Further, the induction heating coil 1 according to this embodiment can be manufactured at a lower unit cost than that of an induction heating coil manufactured by brazing, so that it is possible to reduce the manufacturing cost.

Meanwhile, the hardening depth of an object to be heated that the induction heating coil 1 according to this embodiment inductively heats is equivalent to the hardening depth of an object to be heated that the induction heating coil manufactured by brazing inductively heats. Results of comparisons of hardening depths according to the embodiment with those in related art will be described later by using an example. Further, as for the fundamental physical properties, the induction heating coil manufactured by brazing has a conductivity of 100% because it is manufactured from pure copper. Meanwhile, the induction heating coil 1 according to this embodiment is made of a copper-based alloy, so its conductivity is also high e.g., about 90%, and it can be adequately used as an induction heating coil.

<Configuration and Operations of Additive Manufacturing Apparatus>

Figure 5:
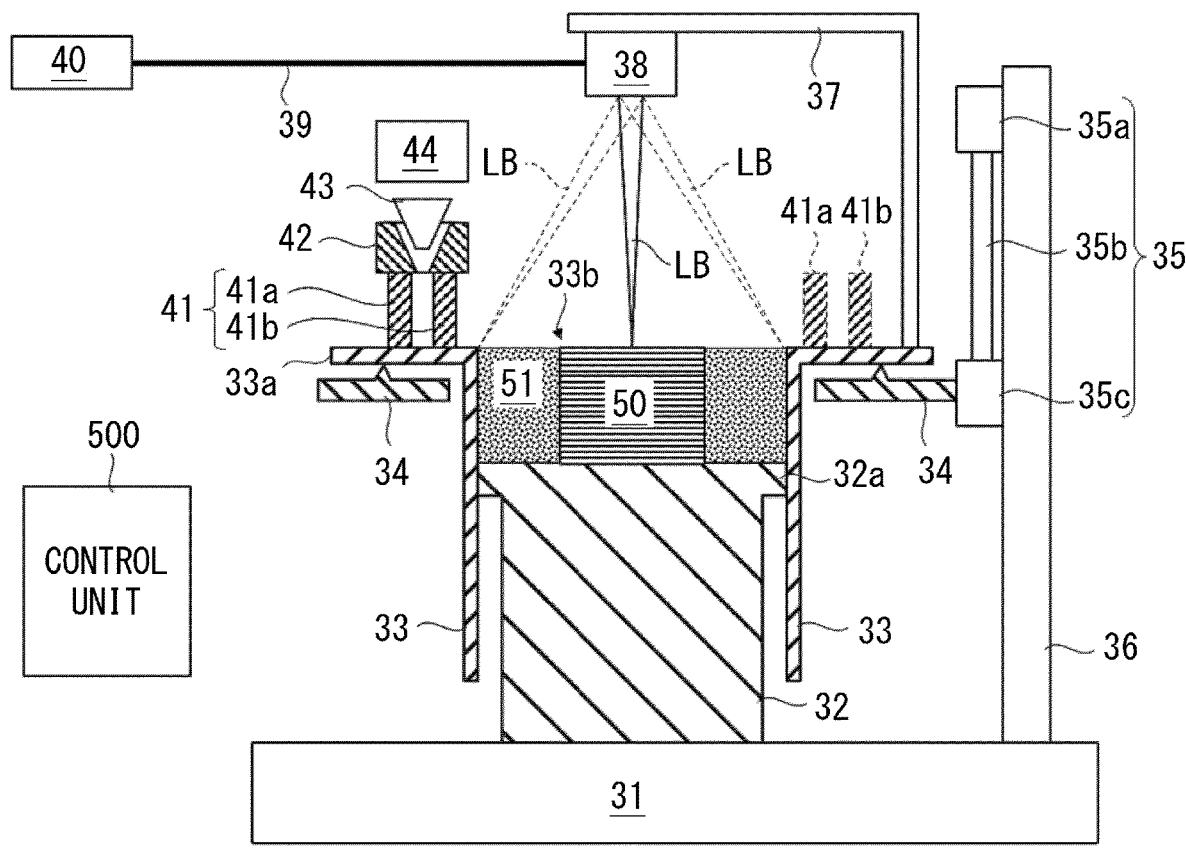
FIG. 5 is a schematic cross-sectional view showing an example of an additive manufacturing apparatus used in a method for manufacturing an induction heating coil according to an embodiment.

Next, an additive manufacturing apparatus used in a method for manufacturing an induction heating coil according to an embodiment will be described with reference to FIG. 5. FIG. 5 is a schematic cross-sectional view showing an example of an additive manufacturing apparatus used in a method for manufacturing an induction heating coil according to an embodiment. As shown in FIG. 5, the additive manufacturing apparatus includes a base 31, a surface plate 32, a molding tank 33, a molding tank support part 34, a molding tank drive unit 35, a support pillar 36, a support part 37, a laser scanner 38, an optical fiber 39, a laser oscillator 40, a squeegee 41, a gutter 42, a powder distributor 43, a powder supply unit 44, and a control unit 500.

The base 31 is a platform for fixing the surface plate 32 and the support pillar 36. The base 31 is installed on a floor surface so that the top surface thereof on which the surface plate 32 is placed is horizontal. The surface plate 32 is placed and fixed on the horizontal top surface of the base 31. The top surface of the surface plate 32 is also horizontal, and a metal powder 51 is deposited on the top surface of the surface plate 32, so that an article to be molded 50 having a 3D (three-dimensional) shape (hereinafter also referred to as a 3D article to be molded 50 or the like) is formed.

Note that although the actual article to be molded 50 is the induction heating coil 1 shown in FIGS. 1 to 4, the article to be molded 50 shown in FIG. 5 is schematically drawn in order to explain the additive manufacturing apparatus.

In the example shown in FIG. 5, the surface plate 32 is a member having a rectangular prism shape. As shown in FIG. 5, a flange-like protrusion 32a extending in the horizontal direction is formed over the entire peripheral edge of the top surface of the surface plate 32. The outer peripheral surface of this protrusion 32a is in contact with the inner surface of the molding tank 33 over the entire circumference, it is possible to hold the metal powder 51 in the space enclosed by the top surface of the surface plate 32 and the inner surface of the molding tank 33. Note that it is possible to improve the force for holding the metal powder 51 by providing a sealing member (not shown) made of, for example, felt on the outer peripheral surface of the protrusion 32a that is in contact with the inner surface of the molding tank 33.

The molding tank 33 is a cylindrical member that holds the metal powder 51 deposited on the top surface of the surface plate 32 from the sides thereof. In the example shown in FIG. 5, since the surface plate 32 having a rectangular prism shape, the molding tank 33 is a rectangular pipe equipped with the flange part 33a at the upper end thereof. The molding tank 33 is formed of a stainless-steel plate having, for example, a thickness of about 1 to 6 mm (preferably about 3 to 5 mm), and its weight is light. A metal powder layer is formed at the upper opened end 33b of the molding tank 33, and a metal layer is formed by applying a laser beam LB to this metal powder layer. The shape of the upper opened end 33b is, for example, a square of 600 mm×600 mm.

Further, the molding tank 33 is disposed so that it can be moved in the vertical direction (i.e., in the z-axis direction). As will be described in detail later, the article to be molded 50 is formed in such a manner that every time a metal layer is formed, the molding tank 33 is raised by a certain amount relative to the surface plate 32. Note that in the additive manufacturing apparatus according to the embodiment, only the molding tank 33, which has a certain weight and has a light weight, needs to be raised. Therefore, in the formation of each metal powder layer, it can be formed with high precision. As a result, the article to be molded 50 can be formed with high precision.

The molding tank support part 34 is a support member that supports the under surface of the flange part 33a of the molding tank 33 at three points so that the top surface of the flange part 33a becomes horizontal. The molding tank support part 34 is connected to a connecting part 35c of the molding tank drive unit 35, which moves the molding tank 33 in the vertical direction (in the z-axis direction).

The molding tank drive unit 35 is a driving mechanism for moving the molding tank 33 in the vertical direction (in the z-axis direction). The molding tank drive unit 35 includes a motor 35a, a ball screw 35b, and the connecting part 35c. When the motor 35a is driven, the ball screw 35b, which extends in the z-axis direction, rotates. Then, as the ball screw 35b rotates, the connecting part 35c moves in the vertical direction (in the z-axis direction) along the ball screw 35b. As described above, since the molding tank support part 34, which supports the molding tank 33, is connected to the connecting part 35c, the molding tank 33 can be moved in the vertical direction (in the z-axis direction) by the molding tank drive unit 35. Note that the driving source of the molding tank drive unit 35 is not limited to the motor. For example, a hydraulic cylinder or the like may be used as the driving source.

Note that the molding tank drive unit 35 is fixed to the upper part of the support pillar 36, which is disposed so as to extend roughly vertically (i.e., in the vertical direction)

from the base 31. As described above, since the molding tank drive unit 35 is disposed outside the molding tank 33 in the additive manufacturing apparatus according to this embodiment, it can be easily maintained.

The laser scanner 38 applies a laser beam LB to the metal powder layer formed in the upper opened end 33b of the molding tank 33. The laser scanner 38 includes a lens and a mirror (not shown). Therefore, as shown in FIG. 5, the laser scanner 38 can focus the laser beam LB at an arbitrary part on the metal powder layer irrespective of its position on the horizontal plane (on the xy-plane), i.e., its position on the metal powder layer.

Note that the laser beam LB is generated in the laser oscillator 40 and is guided into the laser scanner 38 through the optical fiber 39. Note that a metal layer can be formed by applying an electron beam to the metal powder layer by using an electron beam generation apparatus (not shown) instead of using the laser oscillator 40.

Further, the laser scanner 38 is fixed to the flange part 33a of the molding tank 33 through the support part 37. Therefore, it is possible to keep the distance between the laser scanner 38 and the metal powder layer, which is the target of the application of the laser beam LB, constant. Therefore, the additive manufacturing apparatus according to the embodiment can manufacture the article to be molded 50 with high precision.

The squeegee 41 includes a first squeegee 41a and a second squeegee 41b. Both of the first and second squeegees 41a and 41b extend in the y-axis direction. Further, the squeegee 41 can slide in the x-axis direction from a part of the flange part 33a to the opposite part of the flange part 33a through the upper opened end 33b of the molding tank 33.

As shown in FIG. 5, a metal powder is supplied between the first and second squeegees 41a and 41b in a state in which they are disposed on a part of the flange part 33a located on the negative side on the x-axis. Note that an amount of the metal powder corresponding to the formation of two metal powder layers is supplied at a time. That is, by sliding the squeegee 41 from the part of the flange part 33a located on the negative side on the x-axis to the part of the flange part 33a located on the positive side on the x-axis, one metal powder layer is formed in the upper opened end 33b of the molding tank 33.

As indicated by broken lines in FIG. 5, while a metal layer is being formed by applying the laser beam LB to this metal powder layer, the squeegee 41 waits (e.g., is at a standstill) on the part of the flange part 33a located on the positive side on the x-axis. Then, the squeegee 41 slides from the part of the flange part 33a located on the positive side on the x-axis to the part of the flange part 33a located on the negative side on the x-axis, so that another metal powder layer is formed in the upper opened end 33b of the molding tank 33.

Note that, for example, if the area in which a metal layer is formed is narrow, the squeegee 41 may not slide from the part of the flange part 33a located on the negative side on the x-axis to the part of the flange part 33a located on the positive side on the x-axis, i.e., may not slide by the maximum distance, but the sliding may be stopped at a halfway point after covering the area in which the metal layer is formed. The amount of metal powder for forming a metal powder layer can be reduced, and the time for the formation can be shortened.

The gutter 42 and the powder distributor 43 are used to distribute a metal powder charged from the powder supply unit 44 uniformly in the longitudinal direction of the squeegee 41. An opening is formed on the under surface of the gutter 42. The opening is narrower than the distance between the first and second squeegees 41a and 41b (in the x-axis direction) and has a length roughly equal to the powder charging area of the squeegee 41 (in the y-axis direction).

The powder distributor 43 is a plate-like member having a shape roughly identical to the cross-sectional shape of the groove of the gutter 42. The powder distributor 43 can slide in the y-axis direction by a driving mechanism (not shown). Note that, in FIG. 5, the powder distributor 43 is not in contact with the gutter 42 for the sake of easier understanding. However, in reality, the powder distributor 43 slides while being in contact with side surfaces of the groove of the gutter 42 without any gaps therebetween on both sides thereof. As the powder distributor 43 slides from one end at which a metal powder is charged in the gutter 42 to the other end, the metal powder is uniformly distributed in the longitudinal direction of the squeegee 41 (i.e., in the y-axis direction) through the opening of the gutter 42.

The powder supply unit 44 is a small tank in which the metal powder is contained. Note that the metal powder is, for example, a copper-based alloy powder having an average particle diameter of about 20 μm.

The control unit 500 controls operations performed by the additive manufacturing apparatus. For example, the control unit 500 is connected to the molding tank drive unit 35, the laser scanner 38, the laser oscillator 40, the squeegee 41, and the like through a cable or wirelessly. The control unit 500 stores 3D data for manufacturing the article to be molded 50, and controls these components by using the 3D data. In this way, the additive manufacturing apparatus molds the article to be molded 50.

Although not shown in the drawings, the control unit 500 has functions as a computer, and includes, for example, an arithmetic unit such as a CPU (Central Processing Unit) and a storage unit such as a RAM (Random Access Memory) and a ROM (Read Only Memory) in which various control programs, data, and the like are stored.

Note that the control unit 500 may be divided into a plurality of units.

As described above, in the additive manufacturing apparatus, a 3D article to be molded 50 is manufactured by repeatedly forming metal layers each of which is formed by applying a laser beam to a predetermined area of a metal powder 51 deposited in a layered state, and thereby melting and solidifying the metal powder in the predetermined area.

The article to be molded 50 in this example is the induction heating coil 1 shown in FIG. 1. By using the above-described additive manufacturing apparatus, at least one wall, which extends along the longitudinal direction of a straight pipe and divides the internal path of a straight pipe into a plurality of paths, is formed inside the straight pipe. At least one rhombic through hole is formed in the wall. Further, walls are formed so that the distance between adjacent walls is 5 mm or shorter. As for the order according to which the additive manufacturing is performed, arcuate pipes 21a, 21b, 22a and 22b are formed after straight pipes 23a and 23b are formed.

Figure 6:
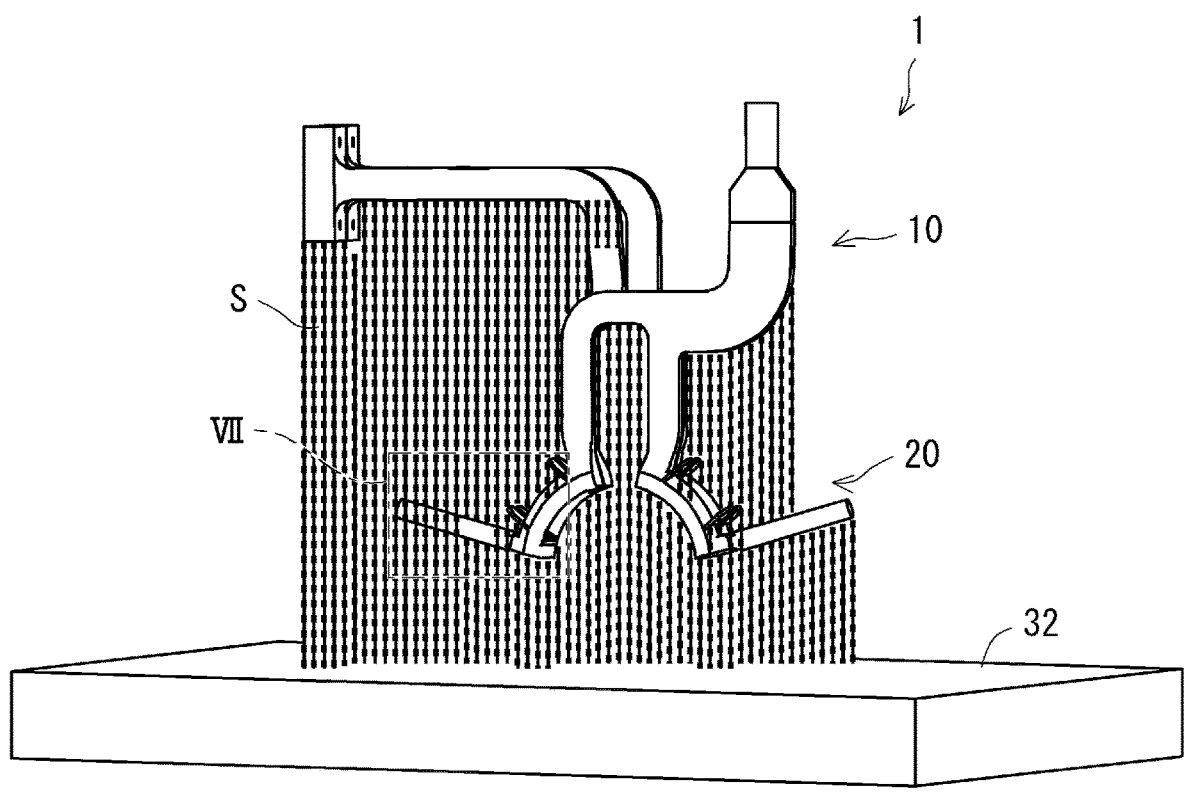
FIG. 6 is a perspective view of an induction heating coil manufactured by a method for manufacturing an induction heating coil according to an embodiment.
Figure 7:
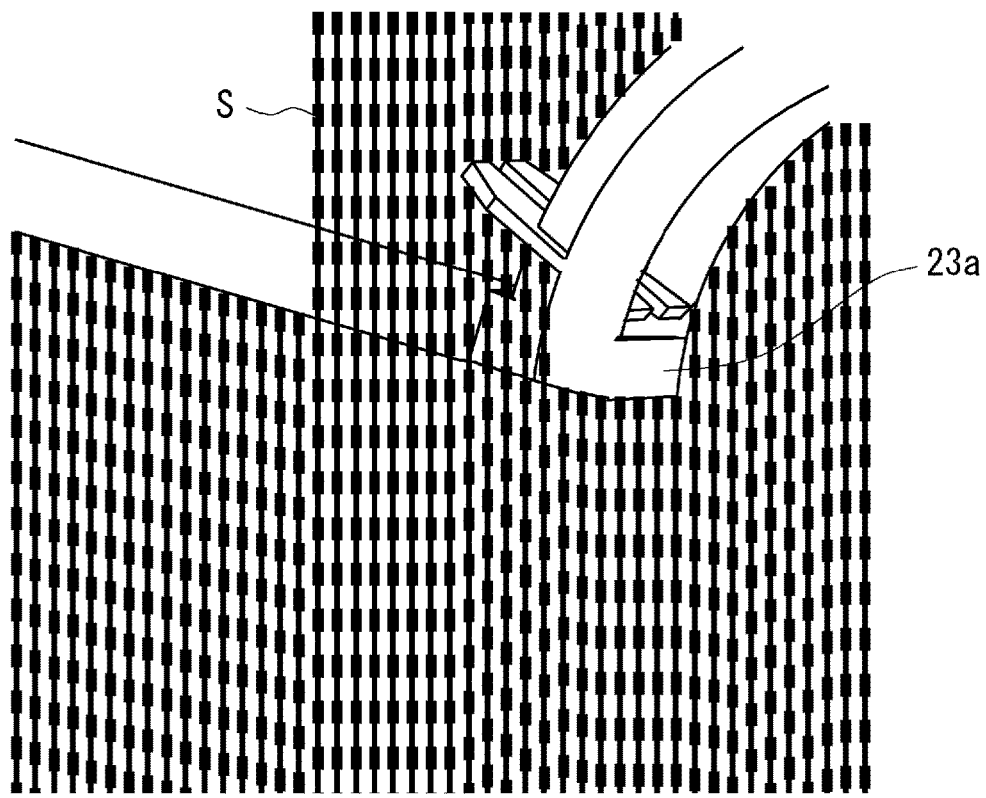
FIG. 7 is an enlarged perspective view showing an area indicated by a symbol VII in FIG. 6.
Figure 8:
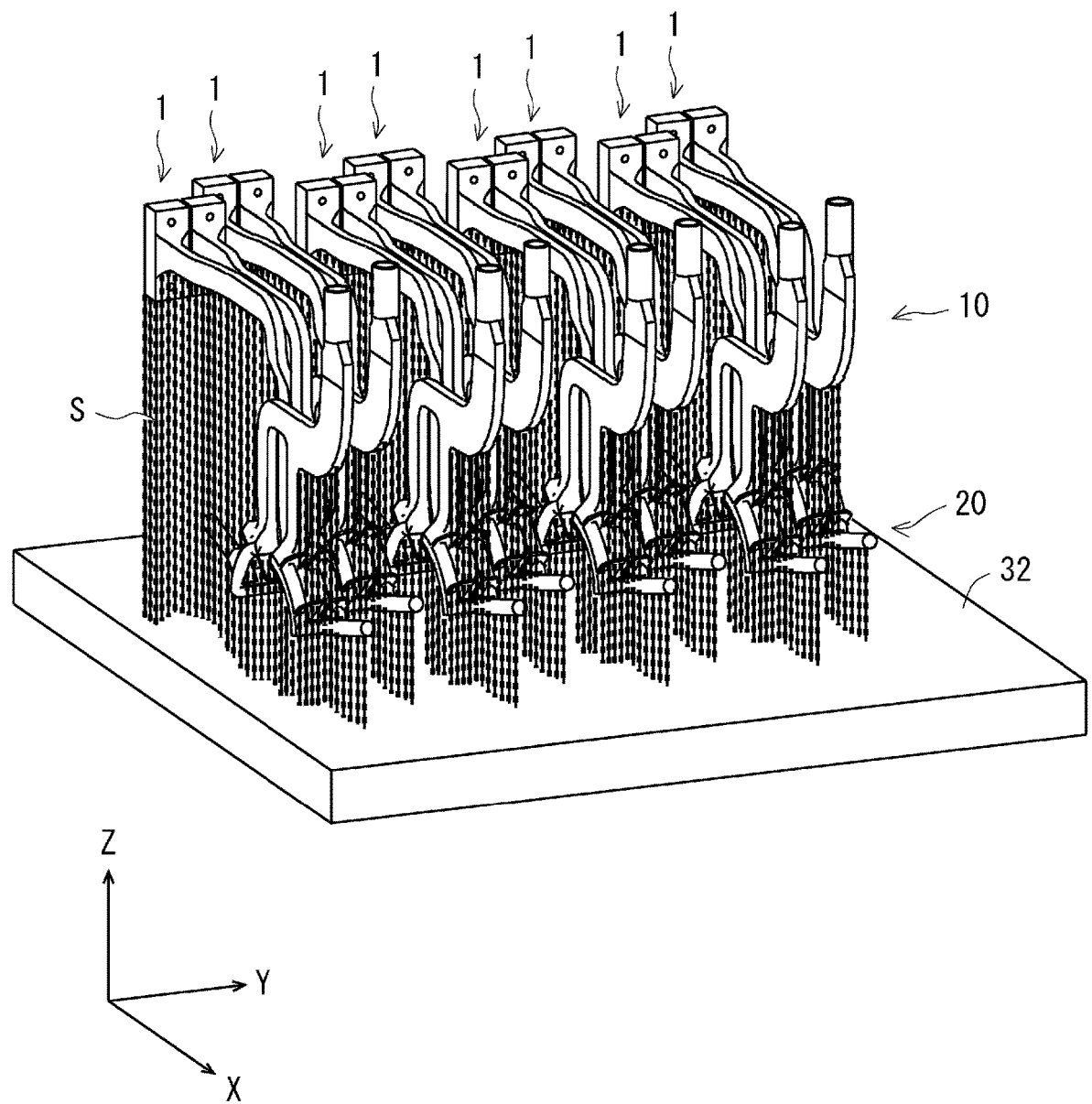
FIG. 8 is a perspective view of an induction heating coil manufactured by a method for manufacturing an induction heating coil according to an embodiment.

FIGS. 6 to 8 are perspective views of an induction heating coil 1 manufactured by a method for manufacturing an induction heating coil according to an embodiment. FIG. 7 is an enlarged perspective view showing an area indicated by a symbol VII in FIG. 6. In the induction heating coil 1, walls are provided inside the straight pipe of the coil part 20. Therefore, even if the induction heating coil is manufactured at an inclination angle of 90° as shown in FIG. 6, no support S is formed inside the straight pipe 23a as shown in FIG. 7.

Figure 14:
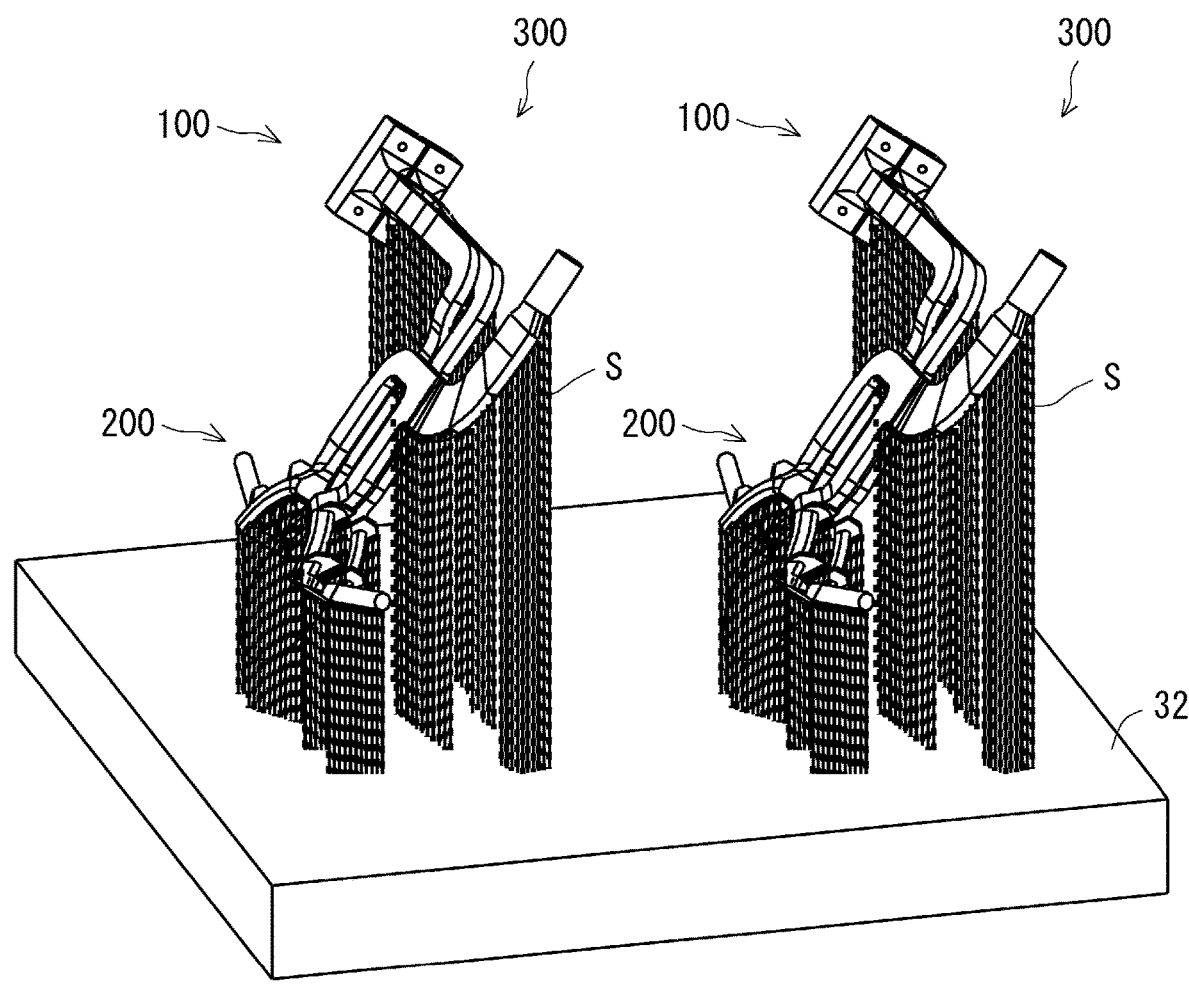
FIG. 14 is a schematic perspective view of an induction heating coil manufactured by a method for manufacturing an induction heating coil in related art.

Since the induction heating coil 1 according to the embodiment can be manufactured at the inclination angle of 90° as described above, the area on the xy-plane required during the manufacturing is smaller than the area required when an induction heating coil is manufactured at an inclination angle of 45° (see FIG. 14). The number of induction heating coils 1 that can be simultaneously manufactured is, for example, eight as shown in FIG. 8, which is larger than two, i.e., larger than the number of induction heating coils that can be manufactured at the inclination angle of 45°. In particular, induction heating coils four times as many as those manufactured at the inclination angle of 45° can be simultaneously manufactured. Therefore, the method for manufacturing induction heating coils according to the embodiment can improve the production efficiency and reduce the manufacturing cost.

Example

The present disclosure will be further described hereinafter by using an example, but the present disclosure is not limited to the example. Crank pins of crankshafts, which were the objects to be heated, were hardened by using an induction heating coil according to an example and those according to comparative examples, and results in regard to their hardening depths were evaluated.

The induction heating coils used for the hardening of the crank pins were as follows.

Comparative Example 1: An induction heating coil manufactured by bonding all the components thereof together by brazing was used.

Comparative example 2: An induction heating coil including no wall inside a straight pipe, manufactured by an additive manufacturing method at an inclination angle of 45° was used.

Example: An induction heating coil manufactured by the manufacturing method described above in the embodiment was used. That is, an induction heating coil including walls inside a straight pipe, manufactured by an additive manufacturing method at an inclination angle of 90° was used.

They will be described with reference to FIGS. 9 to 11.

Figure 9:
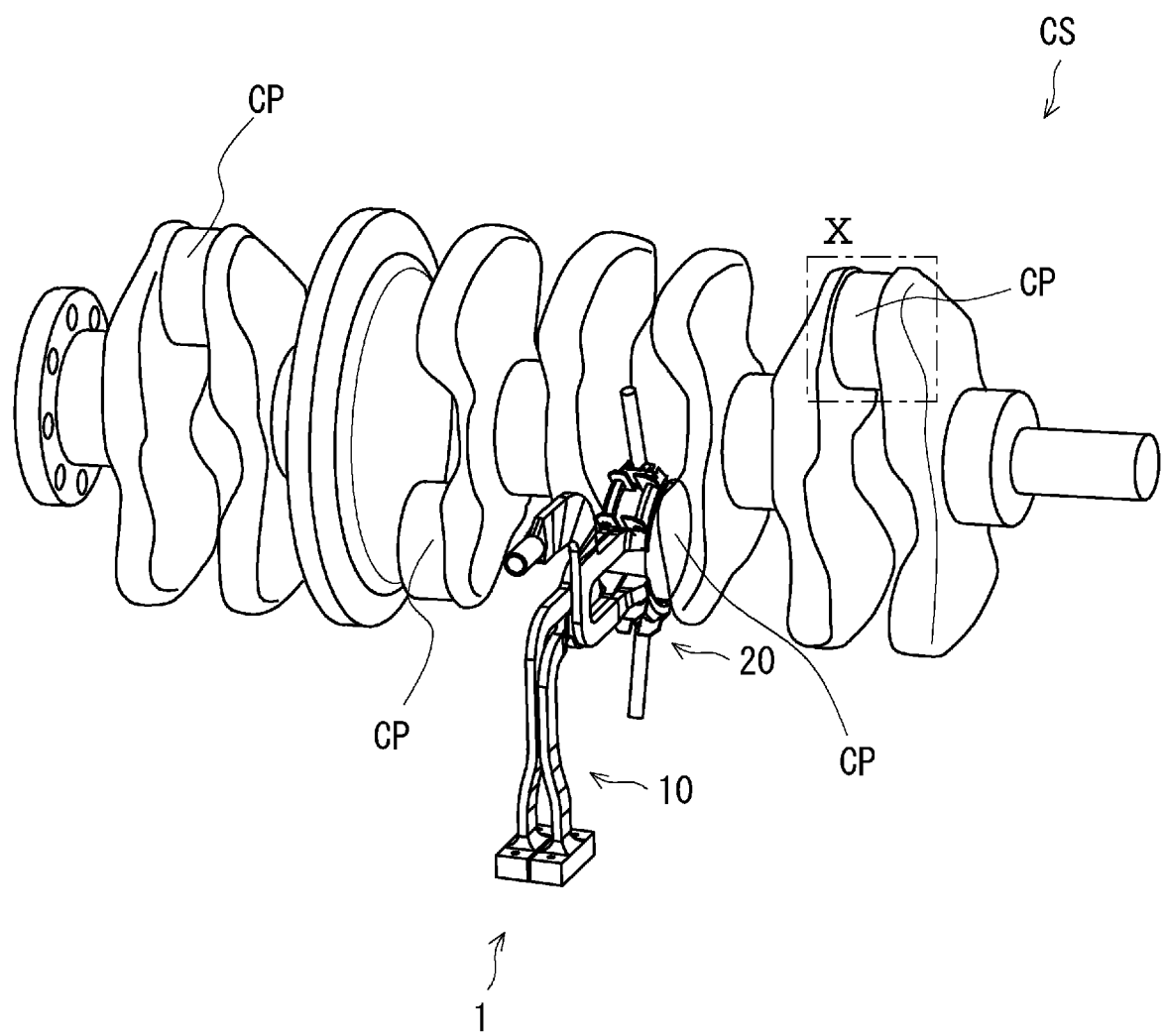
FIG. 9 is a schematic perspective view showing a state in which a crank pin CP of a crankshaft CS is hardened by using an induction heating coil according to an example or a comparative example.

FIG. 9 is a schematic perspective view showing a state in which a crank pin CP of a crankshaft CS is hardened by using an induction heating coil according to the example or the comparative example.

Figure 10:
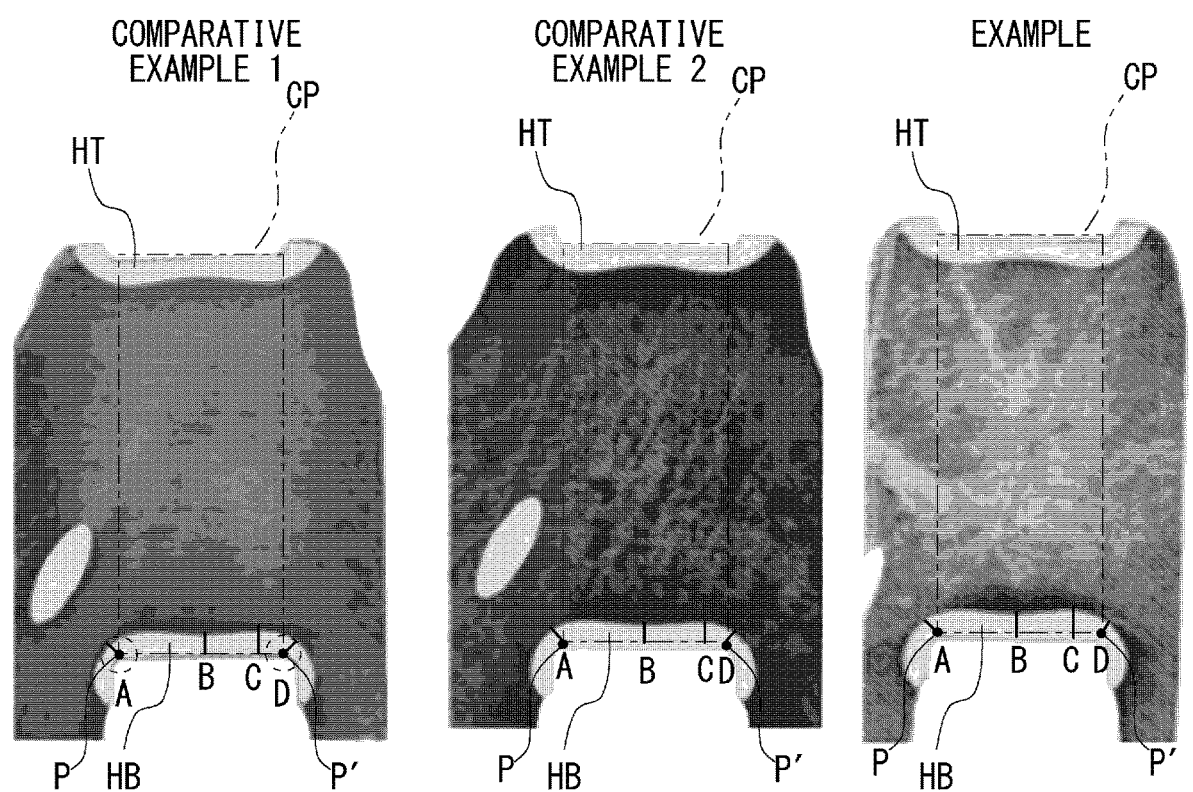
FIG. 10 shows photographs of cross sections showing results of hardening of crank pins CP hardened by the induction heating coils according to the example and the comparative examples.

FIG. 10 shows photographs of cross sections showing results of hardening of crank pins CP hardened by the induction heating coils according to the example and the comparative examples. FIG. 10 shows results of hardening in areas of crank pins CP indicated by a symbol X in FIG. 9. In FIG. 10, upper-side hardened parts HT and lower-side hardened parts HB, all of which were hardened by the induction heating coils, are indicated by whitish color.

In all of the example and the comparative examples, results in regard to the hardening of the lower-side hardened parts HB were evaluated. Specifically, as shown in FIG. 10, hardening depths at positions A, B, C and D were measured in each of the example and the comparative examples 1 and 2. Specifically, the positions A to D are as follows.

Position A: A radius of a smallest circle that passes through the deepest part of the hardened part and was drawn by using a point P at the left end on the under-surface side of the crank pin CP as the center thereof (indicated by a broken line) was measured as a hardening depth.

Position B: A hardening depth of the shallowest part at which the hardening depth was the shortest near the center of the under-surface side of the crank pin CP was measured.

Position C: A hardening depth of the deepest part at which the hardening depth was the longest between the positions B and D on the under-surface side of the crank pin CP was measured.

Position D: A radius of a smallest circle that passes through the deepest part of the hardened part and was drawn by using a point P' at the right end on the under-surface side of the crank pin CP as the center thereof (indicated by a broken line) was measured as a hardening depth.

Figure 11:
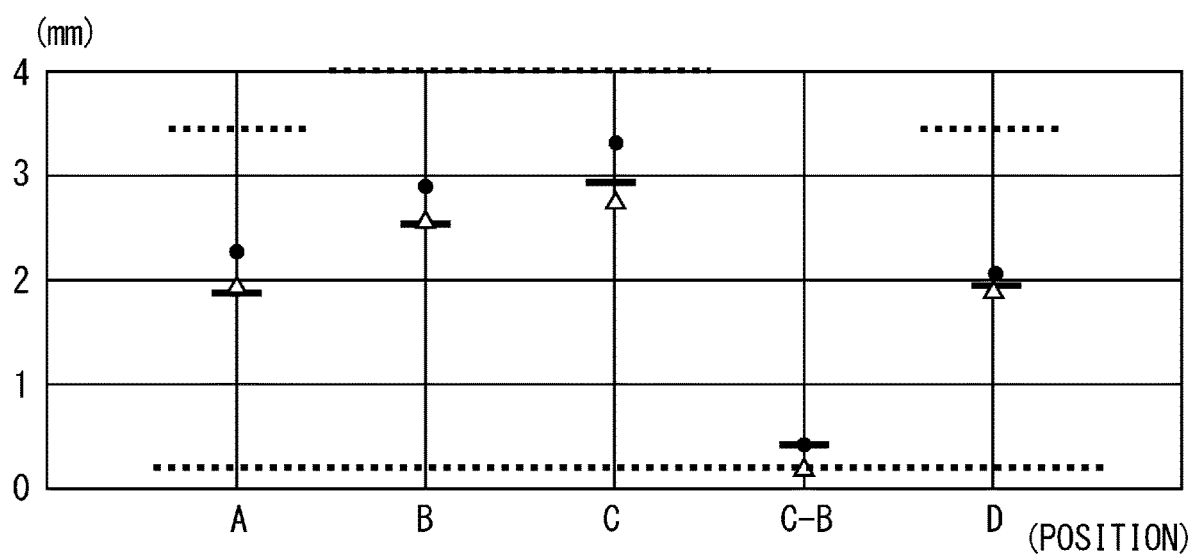
FIG. 11 is a graph showing results of hardening depths of crank pins hardened by the induction heating coils according to the example and the comparative examples.
Figure 12:
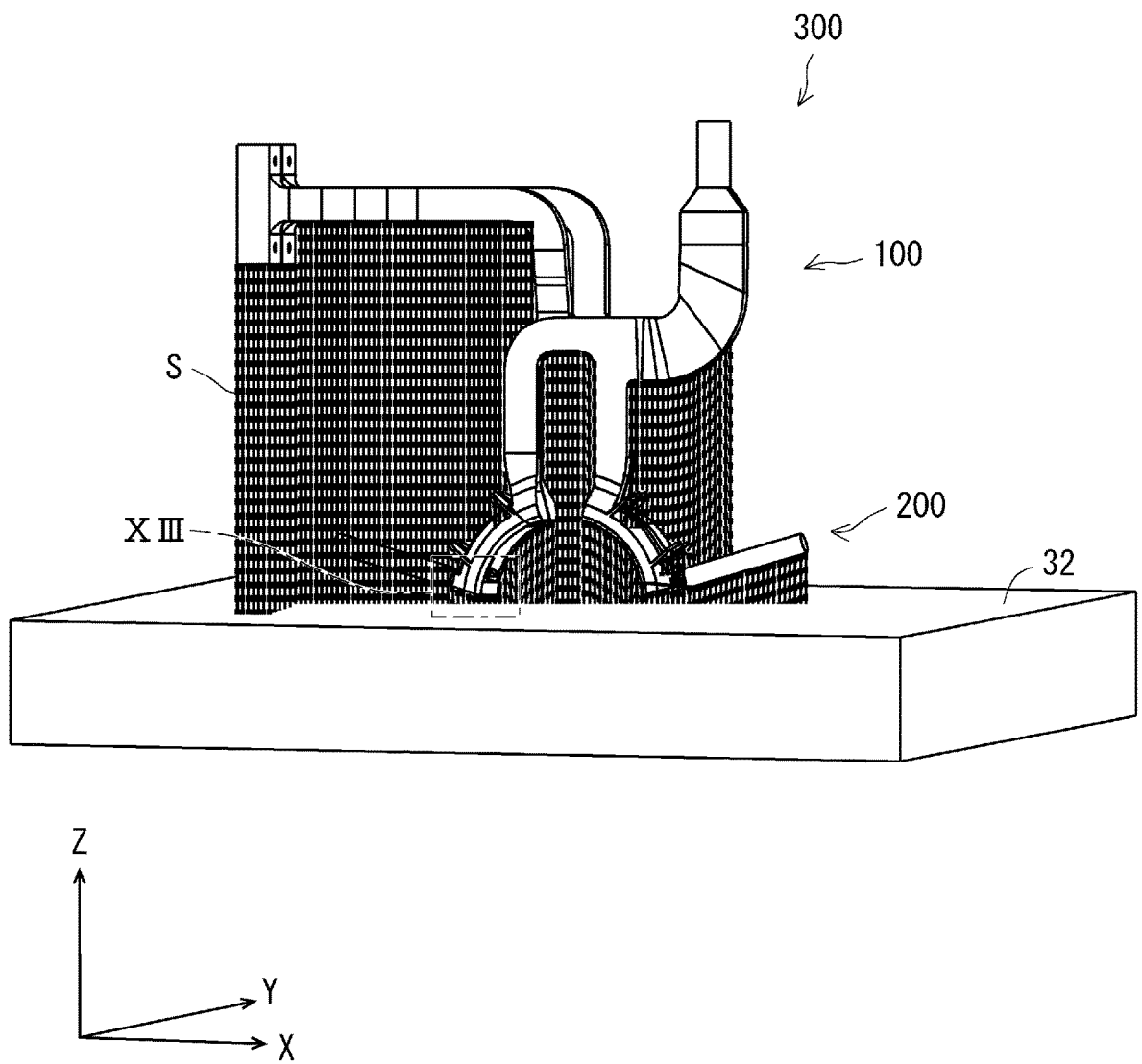
FIG. 12 is a schematic perspective view showing an induction heating coil manufactured by a method for manufacturing an induction heating coil in related art.
Figure 13:
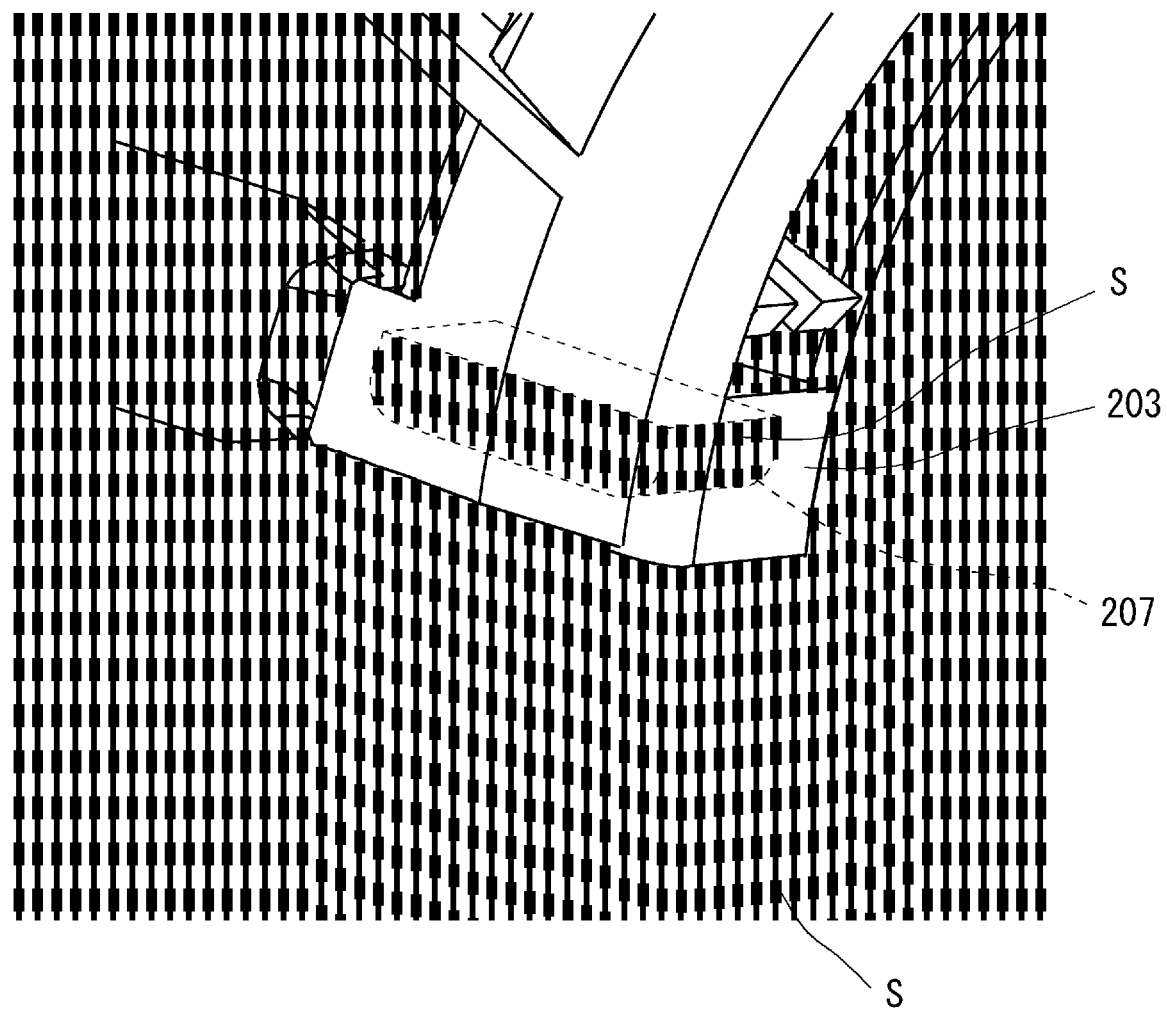
FIG. 13 is an enlarged view of an area XIII in FIG. 12.

FIG. 11 is a graph showing results of the hardening depths of the crank pins hardened by the induction heating coils according to the example and the comparative examples. In the graph in FIG. 11, the horizontal axis indicates the positions A to D, and the vertical axis indicates the measured hardening depths. The "C-B" on the horizontal axis indicates a difference between the hardening depth at the position B and that at the position C, which was obtained by subtracting the hardening depth at the position B, at which the hardening depth is shortest, from the hardening depth at the position C, at which the hardening depth is longest.

Broken lines in the graph in FIG. 11 are reference lines indicating a hardening standard which means that hardening is sufficient. That is, when the hardening depth is within a range between the upper and lower reference lines in the graph, it satisfies the hardening standard. As shown in the graph in FIG. 11, the crank pins hardened by the induction heating coils according to the example and the comparative examples 1 and 2 satisfy the hardening standard at all of the positions A to D. Further, the value of the difference between the hardening depth at the position B and that at position C also satisfies the hardening standard.

As described above, all the induction heating coils according to the example and the comparative examples 1 and 2 satisfy the hardening standard. However, the induction heating coil according to the example provides the following advantageous effects over the induction heating coils according to the comparative examples 1 and 2.

Firstly, the induction heating coil according to the example is compared with the induction heating coil according to the comparative example 1, i.e., the induction heating coil manufactured by bonding all the components thereof together by brazing. Since the induction heating coil according to the example was manufactured by the additive manufacturing method, all the parts were integrally molded. Therefore, it has a longer life span than that of the induction heating coil manufactured by bonding all the components thereof together by brazing. Specifically, while an induction heating coil manufactured by brazing can be used for an average of 20,000 shots and a maximum of 30,000 shots, the induction heating coil according to this embodiment can be used for 90,000 shots. Further, the induction heating coil according to the embodiment can be manufactured at a lower unit cost than that of the induction heating coil according to the comparative example 1, so that it is possible to reduce the manufacturing cost. Further, as for the fundamental physical properties, the induction heating coil according to the comparative example 1 has a conductivity of 100% because it was manufactured from pure copper. Meanwhile, the induction heating coil according to the example is made of a copper-based alloy, so its conductivity is also high e.g., 90%, and it can be adequately used as an induction heating coil.

Next, the induction heating coil according to the example is compared with the induction heating coil according to the comparative example 2, i.e., the induction heating coil manufactured by the additive manufacturing method at the inclination angle of 45°. Since the induction heating coil according to the example can be manufactured at the inclination angle of 90° as described above, the area on the xy-plane required during the manufacturing is smaller than the area required when the induction heating coil according to the comparative example 2 is manufactured at the inclination angle of 45°. The number of induction heating coils that can be simultaneously manufactured is, for example, eight, which is larger than two, i.e., larger than the number of induction heating coils that can be manufactured at the inclination angle of 45°. In particular, induction heating coils four times as many as those manufactured at the inclination angle of 45° can be simultaneously manufactured. Therefore, the method for manufacturing induction heating coils according to the example can improve the production efficiency and reduce the manufacturing cost.

As described above, the induction heating coil according to the example provides the advantageous effects as compared to the induction heating coils according to comparative examples 1 and 2. Further, the results indicating that an induction heating coil can be molded by the additive manufacturing method without forming any support inside thereof, and that the production efficiency can be improved were obtained.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An induction heating coil comprising:
a pair of arcuate pipes curved in an arcuate shape along a circumferential direction of an outer peripheral surface of a cylindrical object to be heated and arranged side by side; and
a straight pipe connecting one end of one of the pair of arcuate pipes and one end of the other of the pair of arcuate pipes to each other, wherein
at least one wall is formed inside the straight pipe, the at least one wall extending along a longitudinal direction of the straight pipe and dividing an internal path of the straight pipe into a plurality of paths, and
at least one rhombic through hole is formed in the at least one wall.

2. The induction heating coil according to claim 1, wherein
the at least one wall comprises two walls adjacent to each other and,
a distance between the two walls is 5 mm or less.

3. A method for manufacturing an induction heating coil, in which the induction heating coil is molded by repeating:
depositing a metal powder in a layered state; and
forming metal layers by repeatedly applying a laser beam to a predetermined area of the metal powder deposited in the layered state, and thereby melting and solidifying the metal powder in the predetermined area, and
successively laminating the metal layers vertically upward, wherein
the induction heating coil comprises a pair of arcuate pipes curved in an arcuate shape along a circumferential direction of an outer peripheral surface of a cylindrical object to be heated and arranged side by side, and
a straight pipe connecting one end of one of the pair of arcuate pipes and one end of the other of the pair of arcuate pipes to each other,
at least one wall is formed inside the straight pipe, the at least one wall extending along a longitudinal direction of the straight pipe and dividing an internal path of the straight pipe into a plurality of paths, and
at least one rhombic through hole is formed in the at least one wall.

4. The method for manufacturing an induction heating coil according to claim 3, wherein
the at least one wall comprises two walls adjacent to each other and,
a distance between the two walls is 5 mm or less.

5. The method for manufacturing an induction heating coil according to claim 3, wherein the arcuate pipe is molded after the straight pipe is molded.

6. The induction heating coil according to claim 1, wherein
the straight pipe extends in the longitudinal direction between the one end of the one of the pair of arcuate pipes and the one end of the other of the pair of arcuate pipes.

* * * * *